United States Patent
Maginnis et al.

(10) Patent No.: US 8,845,951 B2
(45) Date of Patent: Sep. 30, 2014

(54) METHOD OF RAPID SINTERING OF CERAMICS

(75) Inventors: Stephen Maginnis, Irvine, CA (US); George Paskalov, Torrance, CA (US)

(73) Assignee: James R. Glidewell Dental Ceramics, Inc., Newport Beach, CA (US)

(*) Notice: Subject to any disclaimer, the term of this patent is extended or adjusted under 35 U.S.C. 154(b) by 388 days.

(21) Appl. No.: 13/317,223

(22) Filed: Oct. 12, 2011

(65) Prior Publication Data

US 2012/0267830 A1    Oct. 25, 2012

Related U.S. Application Data

(60) Provisional application No. 61/456,028, filed on Oct. 29, 2010.

(51) Int. Cl.
   *C04B 35/48*   (2006.01)
   *F27B 14/06*   (2006.01)

(52) U.S. Cl.
   CPC .............. *C04B 35/48* (2013.01); *F27B 14/061* (2013.01)
   USPC ........................................................ 264/603

(58) Field of Classification Search
   USPC ........................................................ 264/603
   See application file for complete search history.

(56) References Cited

U.S. PATENT DOCUMENTS

| | | | | |
|---|---|---|---|---|
| 4,059,663 A | * | 11/1977 | Miles et al. | 264/652 |
| 5,039,657 A | * | 8/1991 | Goldman et al. | 505/330 |
| 5,656,564 A | | 8/1997 | Nakayama et al. | |
| 6,558,821 B1 | | 5/2003 | Shinosawa et al. | |
| 6,905,993 B2 | | 6/2005 | Sakuta et al. | |
| 2005/0115743 A1 | * | 6/2005 | Griffo | 175/426 |
| 2006/0055092 A1 | * | 3/2006 | Watari et al. | 266/274 |
| 2011/0269618 A1 | * | 11/2011 | Knapp et al. | 501/103 |
| 2013/0048388 A1 | * | 2/2013 | Griffo et al. | 175/428 |

* cited by examiner

*Primary Examiner* — Joseph S Del Sole
*Assistant Examiner* — Russell Kemmerle, III
(74) *Attorney, Agent, or Firm* — Greenberg Traurig, LLP

(57) ABSTRACT

Rapid sintering techniques for densifying zirconium dioxide based ceramic materials employing electromagnetic induction heating or inductive coupled plasma, reducing processing time from hours to minutes. In one embodiment a water-cooled coil is connected to a radio frequency power supply. The coil surrounds a susceptor body which in turn surrounds the ceramic to be sintered. The susceptor heats up in response to a magnetic field emanating from the coil as the coil receives electric power. The heat in turn is radiated from the susceptor and heats the ceramic. In another embodiment, the coil is connected to a radio frequency power supply of sufficiently high frequency and power to establish a plasma in the gas which surrounds the ceramic. The plasma then heats the ceramic. The method is especially useful for sintering ceramic dental appliances, in minutes which can lead to in situ fabrication of such appliances while a dental patient waits.

11 Claims, 3 Drawing Sheets

METHOD OF RAPID SINTERING OF CERAMICS

CROSS-REFERENCE TO RELATED APPLICATIONS

This application takes priority from provisional application Ser. No. 61/456,028 on Oct. 29, 2010.

BACKGROUND OF THE INVENTION

1. Field Of The Invention

The present invention relates generally to the field of processing of ceramic materials and more specifically to a method of rapidly sintering such materials using electromagnetic induction heating or inductive coupled plasma.

2. Background Art

It is well known in the art of processing ceramic materials to use intensive heating to densify green or pre-sintered ceramic bodies. This is known as sintering. Typical green or pre-sintered ceramic bodies normally contain voids or pores, which need to be deleted so that the material can be fully densified to achieve strength and wear resistance properties. One common process for doing that is sintering. Issued U.S. Pat. Nos. 5,656,564; 6,558,821; and 6,905,993 provide disclosures of ceramic sintering processes. Conventional sintering employs an oven that uses an electrical heating element where temperature within a relatively small insulated volume can be precisely controlled over a period of several hours. In some cases it may prove to be advantageous to perform sintering more rapidly in order to density a ceramic body while controlling grain growth which can otherwise detract from strength properties. There are also certain scenarios where rapid sintering is desirable to simply expedite the process of finalizing a ceramic body for commercial convenience. One such scenario is the creation of a ceramic dental appliance by a dentist or dental technician, particularly while a dental patient is waiting for an appliance to be constructed and installed in a dental office.

The use of high strength and wear resistant ceramic dental appliances such as crowns has become standard in the dental care industry. The material properties, as well as control of their color and textural characteristics, make ceramic appliances ideal for their use as dental restorations and appliances. Moreover, with the recent advent of intra-oral scanners, desktop CAD/CAM fabrication digitally-controlled milling and fast firing sintering ovens, it has become possible to permit rapid fabrication of such ceramic bodies in a dental office while a patient is present. Unfortunately, even the most rapid firing sintering ovens available today, still take too much time to complete the process of fully sintering a dental appliance. Although these ovens employ state-of-the-art electrical resistance element materials such as molybdenum di-silicide, it may still require up to two hours in a best example conventional sintering oven to complete the sintering process before the appliance is ready for oral installation into a waiting patient. Such extended periods of time that need to be devoted to just the sintering step, make the overall fabrication process more expensive, more energy consumptive, more labor intensive and less convenient for dentists and patients alike. Even the most advanced conventional fast-firing sintering ovens available today, are limited to a rate of heating which is about 40° C. to 70° C. per minute and to a maximum temperature of about 1,800° C. Such limits are the result of the heat-related properties of the resistance elements which are subject to temperature-induced stress and yet are relatively expensive to replace and to the overall size and insulative quality of the furnace which takes energy to create the elevated temperature. Though relative quality and prices vary, a typical fast-firing resistance element may cost about $200.00 and must be treated with care for optimal results.

Thus, despite the technological advances in dental office appliance design and fabrication techniques, there is still a weak link in the overall process, namely the amount of time required for fully densifying the ceramic appliance by sintering.

SUMMARY OF THE INVENTION

The present invention comprises a new time-reducing and energy-saving method of sintering ceramic bodies. This new method is particularly applicable to in situ dental appliance fabrication because it reduces the densification time by at least an order of magnitude from hours to minutes. It therefore makes it possible to permit a dentist or dental technician to complete fabrication of a ceramic dental appliance in a much shorter period of time. It resolves all of the noted disadvantages of existing conventional fast-firing sintering ovens by fully densifying a green or pre-sintered ceramic appliance in several minutes rather than two or more hours. It does this by employing electromagnetic induction heating or plasma induction and thus entirely obviating the stress-sensitive resistive heating elements of the prior art sintering ovens. Moreover, it is expected that such short duration sintering will permit even better grain growth control which could result in a final product which exhibits superior mechanical and optical properties.

One embodiment of the novel sintering method of the present invention uses electromagnetic induction and preferably a susceptor body to rapidly bring a green or pre-sintered metal oxide ceramic object to its optimal sintering temperature. A susceptor body is made of a refractory material which is efficiently heated by an alternating magnetic field while having minimal impact on the chemistry of a ceramic body to be sintered within the susceptor body. One such susceptor material is zirconium.

In that first embodiment of the present invention, an alternating magnetic field is generated using a coil of hollow copper tubing which encircles at least a portion of the susceptor body and containment body. The containment body is an envelope of a refractory material such as quartz or sapphire that allows partial vacuum and or a selected gas environment to surround the susceptor and ceramic body. The susceptor body is preferably an enclosure which may have at least one opening to allow easy placement of the dental restoration and permit gas or other volatiles to escape from the ceramic material during the sintering process. The copper tube coil is electrically connected to an induction power source and also provides for flow of a cooling fluid such as water. Induction power supplies are readily available. For example, one such source is the Ultra Heat model produced by Ultra Flex of Ronkonkoma, N.Y. In one embodiment of the present invention, a crown-type dental appliance made principally of zirconium dioxide was densified using that source connected to a 5-turn coil of quarter-inch hollow copper tubing. The source was set at 218 Volts at 108 kHz, generating about 2.5 kW. The ceramic was optimally densified in about 3 minutes including pre-heating and post-cooling periods of about 20 seconds each.

A second embodiment employs plasma generation to replace the susceptor in the first embodiment. The plasma in this embodiment is generated by the inductive coupled plasma (ICP) technique. The configuration in this device is a vacuum tight tube divided into two main sections: a dielectric section where the plasma is generated (the chamber) and an ancillary section where plasma is dissipated (the reactor). The reactor also includes a port through which vacuum may be pulled on the tube assembly. Wrapping around the chamber is a coil of copper tubing connected to a chilled water system. The coil is electrically connected to a radio frequency generator and matching network.

A dental restoration is placed on a refractory probe or stage and system then closed. At that point the system is pumped down to remove atmospheric gasses and then back flushed with process gas, principally containing all or some percentage oxygen. The radio frequency generator is turned on and matched to the initial load of the system. Power is then applied until a plasma is developed. The ceramic body is then allowed to temper until its net temperature reaches about 600 degrees centigrade. At that time additional power is applied to 5 kW. Here, gas pressure is slowly adjusted to 3-5 Torr while the electric load is re-matched. The system remains in this state for 5 to 10 minutes and then the power is slowly decreased until the plasma is quenched and the power is turned off.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
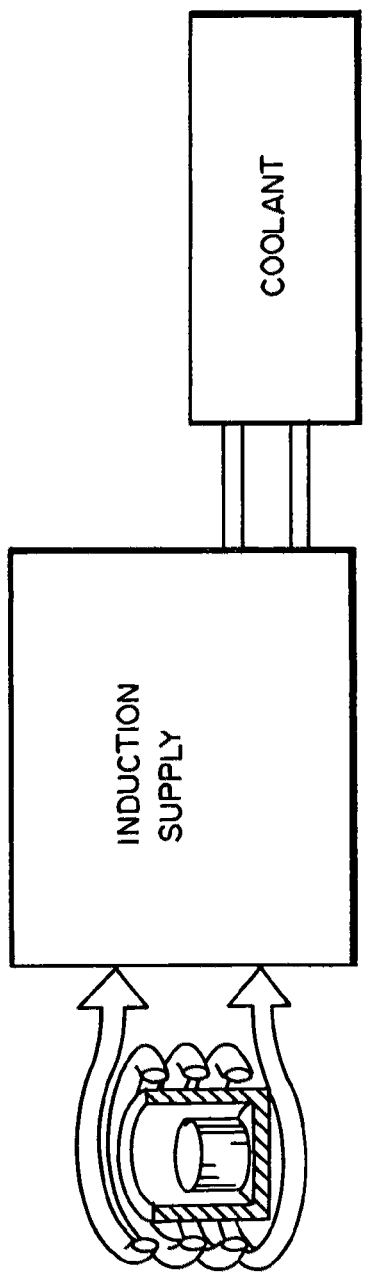
FIG. 1 is a block diagram of a sintering assembly of a first embodiment of the invention.
Figure 2:
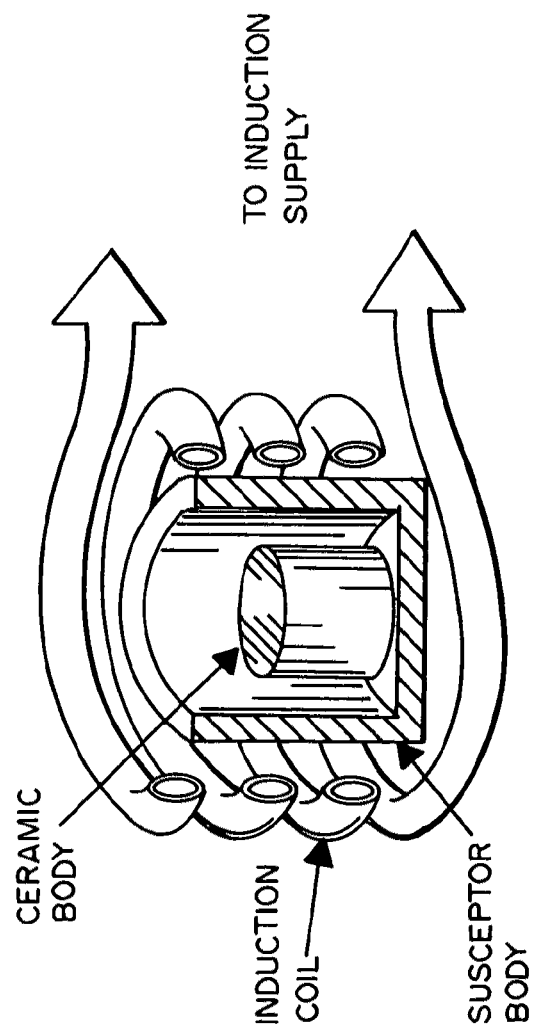
FIG. 2 is a schematic illustration of an induction device used in the assembly of FIG. 1.
Figure 3:
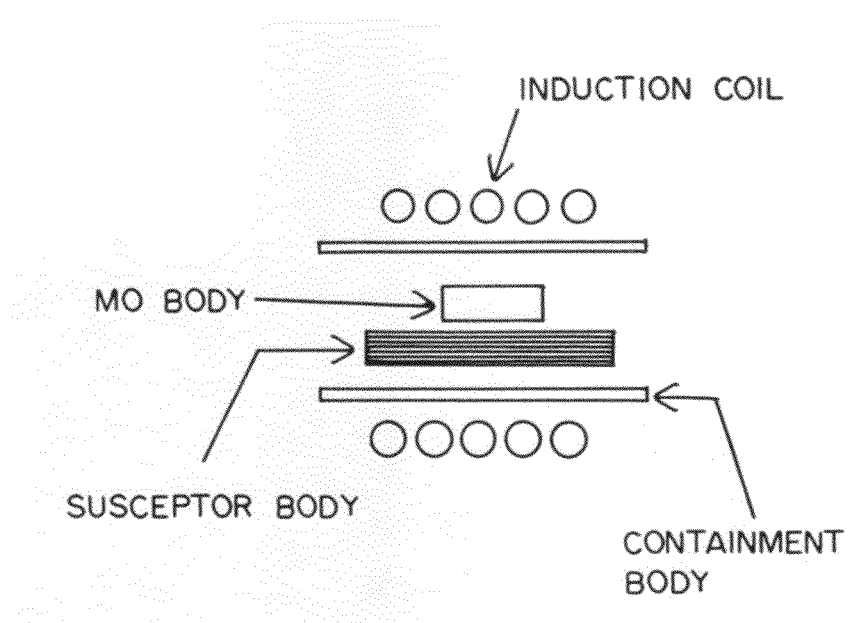
FIG. 3 is a schematic cross-sectional drawing showing an embodiment using a flat susceptor body and a metal oxide body, both within a containment body.
Figure 4:
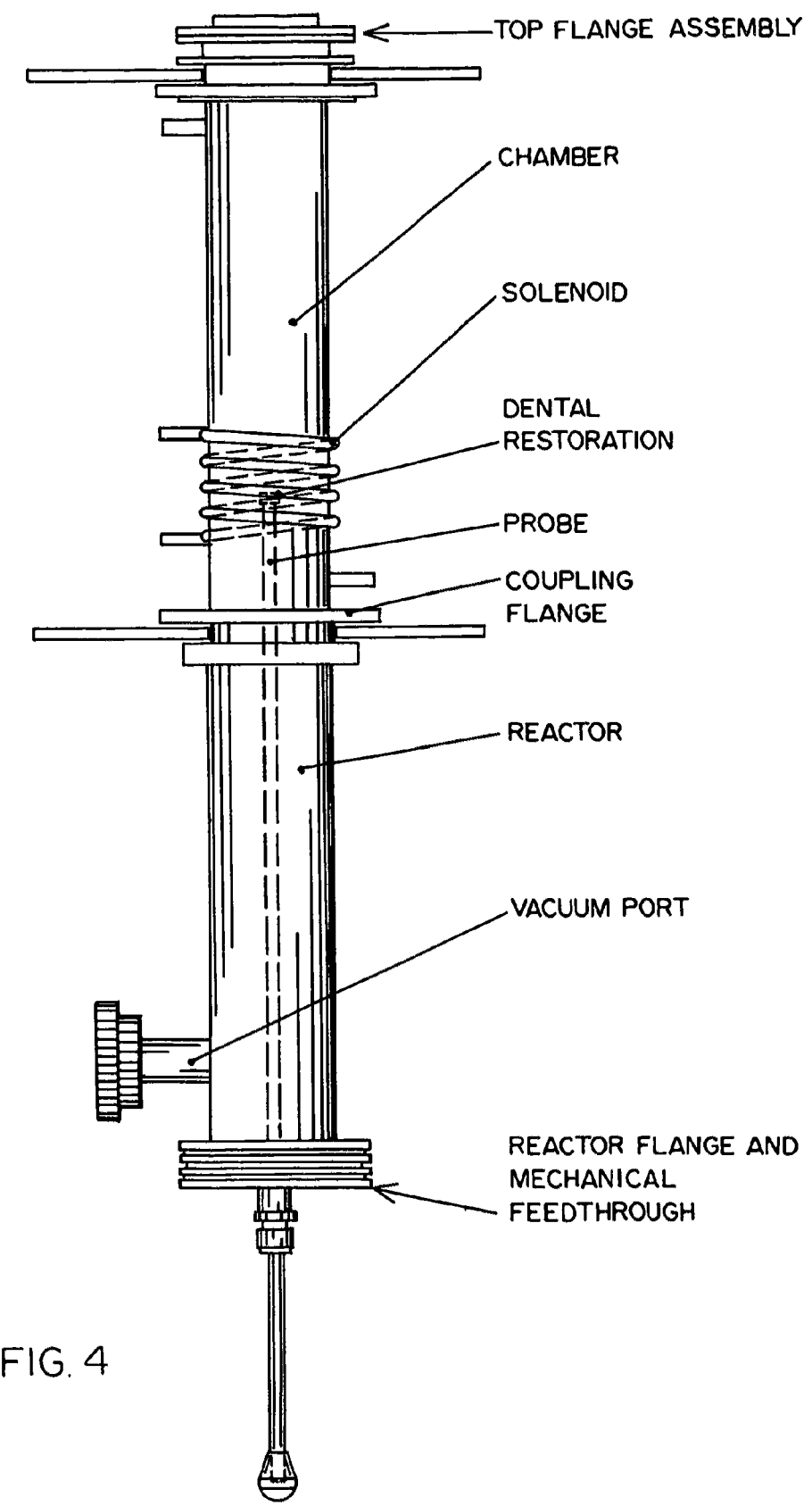
FIG. 4 is a schematic illustration of a second embodiment of the invention employing an inductive coupled plasma technique.

Referring to the accompanying figures, it will be seen that in a first embodiment, the method hereof may be carried out in the manner depicted in FIGS. 1-3. More specifically, the ceramic body to be sintered is placed within a susceptor body surrounded by an induction coil. The coil is, in turn, connected to an induction supply for electrical alternating current flow through the coil to generate a magnetic field around the axis of the coil. In the preferred embodiment, the coil comprises a hollow copper quarter inch tube of about 1.5 inches in inner diameter. The induction supply should be capable of generating up to 5 kW at up to about 120 kHz at a voltage of up to 220 Volts. Moreover, as shown in the block diagram of FIG. 1, the supply should be connected to a source of coolant such as water. The coolant flows through the copper tube of the coil during the heating process. The flow of coolant in the induction source and coil should be up to 2 to 3 gallons per minute to keep the copper tube sufficiently cool to prevent deformation from the heating effect of the current which can be high enough to instantaneously melt the coil.

The susceptor body shown best in FIG. 2 may not be needed in all cases depending upon the susceptance of the ceramic material to a given frequency. However, when the ceramic body is principally zirconium dioxide, such as is common for dental crowns and other dental restorations and appliances, the susceptor body is required to heat the ceramic at least to the point at which the ceramic body can begin to suscept the magnetic field directly. The additional heat provided by the susceptor is then of less importance for primary heating needed for optimal sintering of the ceramic body. Although there may be a number of acceptable susceptor body materials, zirconium and graphite have been employed successfully for sintering zirconia dental crowns. FIG. 3 illustrates a configuration using a flat susceptor wherein a containment body surrounds both the metal oxide body and the susceptor.

A second embodiment of the invention utilizes a plasma to provide the primary sintering heat. The plasma in this embodiment is generated by the inductive coupled plasma (ICP) technique. The configuration in this device is a vacuum tight tube divided into two main sections: a dielectric section where the plasma is generated (the chamber) and an ancillary section where plasma is dissipated (the reactor). The tube assembly is closed on the chamber end by a flange designed to bleed gas into the tube in a swirling pattern down the long axis of the tube. On the reactor end of the rube, a removable flange is fixed through which a mechanical feed-through passes holding a refractory probe. The probe serves as a stage on which to place and position objects in the chamber. The reactor also includes a port through which vacuum may be pulled on the tube assembly. Wrapping around the chamber is a coil of copper tubing connected to a chilled water system. The coil is electrically connected to a radio frequency generator and matching network. In this second embodiment the radio frequency employed is the ISM band of 13.56 MHz.

The reactor flange is opened and mechanical feed-through lowered. A dental restoration is placed on the refractory probe and system then closed. The mechanical feed-through is then manipulated until the restoration is placed inside the chamber toward the center of the solenoid. The system is then pumped down to remove atmospheric gasses and then back flushed with process gas, principally containing all or some percentage oxygen. The pressure is then balanced to about 500 mili Torr. The radio frequency generator is turned on and matched to the initial load of the system. Power is then applied until a plasma is developed near the solenoid. The metal oxide body is then allowed to temper until its net temperature reaches about 600 degrees centigrade where by reduction and thermal stresses are lessened. At that time additional power is applied to 5 kW. Here, pressure is slowly adjusted to 3-5 Torr as the electric load is re-matched. The system remains in this state for 5 to 10 minutes and then the power is slowly decreased until the plasma is quenched and the power is turned off. The vacuum is closed and pressure of the system allowed to rise until equal to atmospheric pressure. The reactor flange is then opened and sintered restoration removed.

It will now be understood that the present invention comprises a novel sintering method for densifying ceramic materials using electromagnetic induction or inductive coupled plasma. While the invention is applicable to processing any sinterable ceramic material, it is especially advantageous for use in sintering dental ceramics by a dentist or dental technician in situ while a patient is present. This advantage results from the reduction in sintering time from hours to minutes which is provided by the invention herein.

We claim:
1. A method of sintering a ceramic body, the method comprising the following steps:
   a. providing an induction coil connected to a source of radio frequency energy and placing said coil around an evacuatable chamber;

b. placing said ceramic body within said chamber and within said coil;

c. evacuating said chamber of air and feeding a gas containing some oxygen into said chamber;

d. increasing said radio frequency energy until a plasma is formed in said chamber and encompassing said ceramic body; and e. adjusting said radio frequency energy over a period of time until said ceramic body is fully sintered.

2. The method recited in claim 1 wherein said ceramic body comprises a ceramic dental restoration.

3. The method recited in claim 2 wherein said ceramic dental restoration is made of zirconium oxide.

4. The method recited in claim 2 wherein said period of time is a maximum of about fifteen minutes.

5. The method recited in claim 2 wherein said radio frequency energy is higher than 1 kW.

6. The method recited in claim 5 wherein said radio frequency energy is at a frequency of at least 400 kHz.

7. The method recited in claim 1 wherein said coil is provided with a flow of chilled water.

8. A method of sintering a dental restoration made predominantly of zirconia-based ceramic material, the method comprising the steps of:

a. placing the dental restoration material into a field in which a plasma can be generated to subject said material to heat and electric field;

b. adjusting the pressure and chemical environment of said field;

c. generating said plasma; and d. controlling said plasma over a selected period of time to fully sinter said dental restoration.

9. The method recited in claim 8 wherein said pressure is in the range of 1 mTorr to 760 Torr.

10. The method recited in claim 8 wherein said chemical environment comprises oxygen.

11. The method recited in claim 8 wherein said plasma generating step is carried out by generating a radio frequency inductively coupled plasma.

* * * * *